United States Patent [19]

Vandell

[11] 4,399,197
[45] Aug. 16, 1983

[54] CUTTING PIPE WITH A CUTTING TORCH

[76] Inventor: Arthur E. Vandell, 66 Stuyvesant Ave., Staten Island, N.Y. 10312

[21] Appl. No.: 281,682

[22] Filed: Jul. 9, 1981

[51] Int. Cl.³ .............................................. B23K 7/04
[52] U.S. Cl. .................................... 428/584; 148/9.6; 266/56; 428/598
[58] Field of Search .......................... 266/56; 148/9.6; 428/584, 598

[56] References Cited

U.S. PATENT DOCUMENTS

| | | | |
|---|---|---|---|
| 3,575,364 | 4/1971 | Frederick | 266/56 |
| 3,688,615 | 9/1972 | Protze et al. | 266/56 |
| 3,856,283 | 12/1974 | Johnson | 266/56 |
| 3,975,003 | 8/1976 | Buford | 266/56 |

Primary Examiner—W. Stallard

[57] ABSTRACT

This disclosure is directed to the cutting of steel pipes and tubes by utilization of a special flexible metal guide in conjunction with a cutting torch. Use of the special flexible metal guide improves the steadiness of the torch, thereby producing a more precise cut.

1 Claim, 3 Drawing Figures

U.S. Patent  Aug. 16, 1983  4,399,197
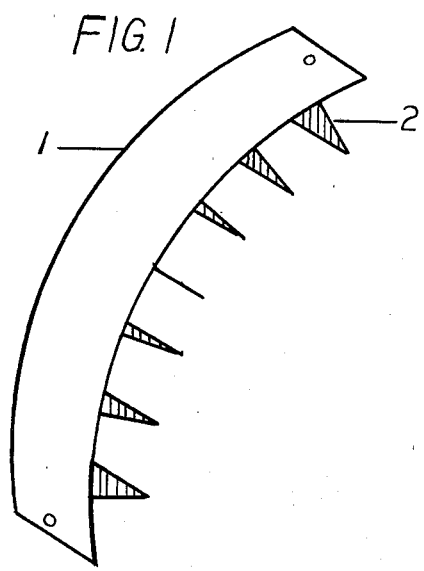
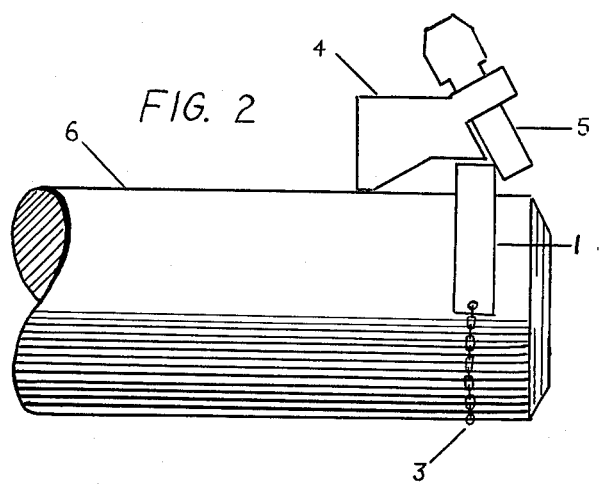
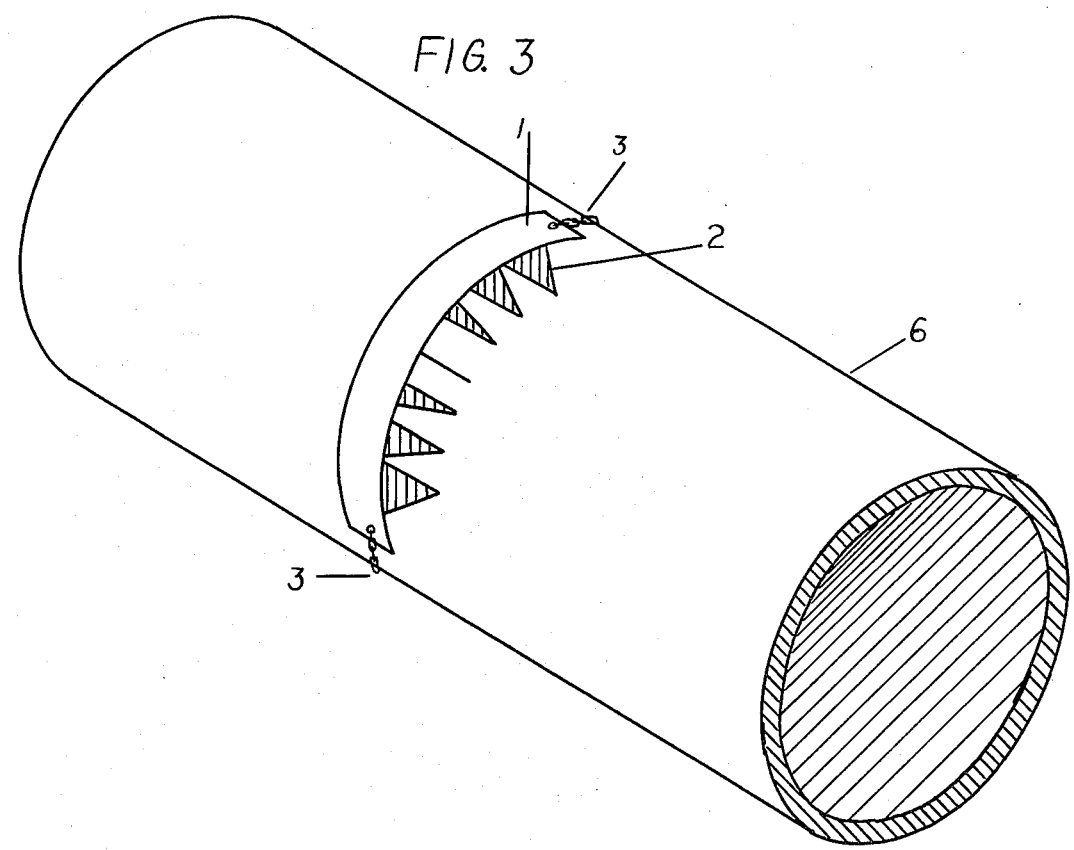

CUTTING PIPE WITH A CUTTING TORCH

BRIEF DESCRIPTION

The object of this invention is to improve the cutting of pipe and tubing with a hand-held cutting torch. As the cut is made, the torch tip is held lightly alongside the edge of the flexible guide. Then the cutting torch is rotated around the pipe as the operator performs the cut.

BRIEF DESCRIPTION OF THE DRAWINGS

FIG. 1 is a perspective view of the flexible guide straight edge.

FIG. 2 is a side view of the pipe being cut with the guide positioned on the pipe and the tip of the torch resting on the guide with the accompaniment of the height and angle control attachment clamped to the tip.

FIG. 3 is a perspective view of the flexible guide positioned on the pipe.

DETAILED DESCRIPTION

The flexible guide (1) is the invention being explained, composed of a flat flexible steel strip as the straight edge with steel strips for legs (2) spaced evenly and fastened perpendicular across the inside face of the straight edge (1). The purpose of the legs (2) is to raise the straight edge (1) the same height above the outside surface of the pipe (6) when fastened snuggly so the torch tip with the aid, if desired, of the tip height and angle control attachment FIG. 2 (4) can follow the straight edge as the cut is being made.

The tip height and angle control attachment FIG. 2 (4) which fastens onto the torch tip, rides on the straight edge and the surface of the pipe (6) to help insure angle control.

The guide is held onto the pipe (6) by a chain (3) and tension spring (not shown). Each end of the guide has a chain attached to it. One end of the spring is hooked into a link of one chain, the other end of the spring is pulled to the desired tension around the pipe (6) and hooked into a link of the opposite chain securing the guide (1) to the pipe (6). This method allows rapid application and tension adjustment. It also allows the guide to be used on different size pipes within its range.

When the cut is made to the end of the guide, the guide is slipped around the pipe and the cut is continued. The guide does not have to be removed from the pipe until the cut is completed.

What is claimed and desired to be secured by Letters Patent is:

1. An apparatus for uniformly cutting pipes comprised of:

a thin strip of flexible, spring-like metal with straight edges, having equally spaced metal support legs attached at right angles to one side of said strip, said strip having a chain and a tension spring attached to one end thereof with means to attach said chain and said tension spring to the other end of said strip, said strip with said chain and said tension spring being capable of being secured about the circumference of a pipe to provide a guide that stands at a consistent height above the surface of a pipe, said guide having the capability of guiding a torch for uniformly cutting pipes.

* * * * *